Nov. 8, 1955 N. K. WARNER 2,722,795
RAKING ATTACHMENT FOR LAWN MOWER
Filed Jan. 19, 1953 3 Sheets-Sheet 1

Norman K. Warner
INVENTOR.

Nov. 8, 1955  N. K. WARNER  2,722,795
RAKING ATTACHMENT FOR LAWN MOWER
Filed Jan. 19, 1953  3 Sheets-Sheet 2

Norman K. Warner
INVENTOR.

BY

Nov. 8, 1955  N. K. WARNER  2,722,795
RAKING ATTACHMENT FOR LAWN MOWER
Filed Jan. 19, 1953  3 Sheets-Sheet 3
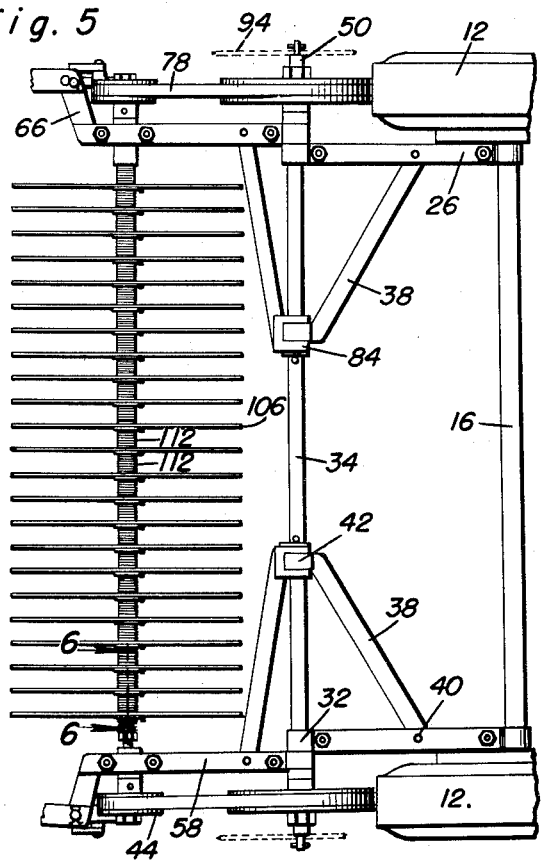
Fig. 5
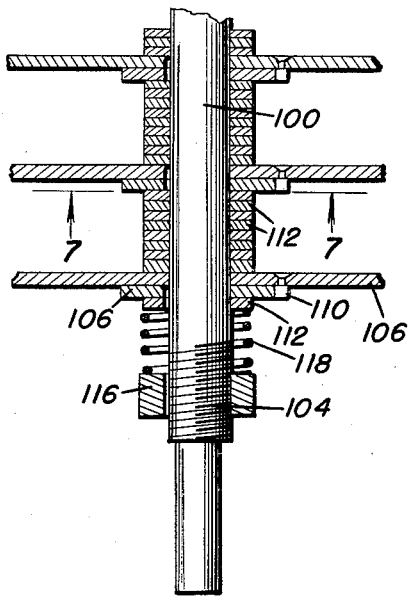
Fig. 6
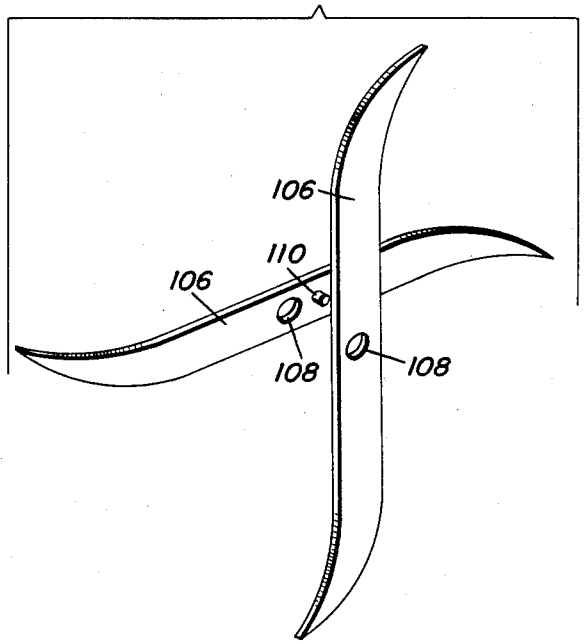
Fig. 8
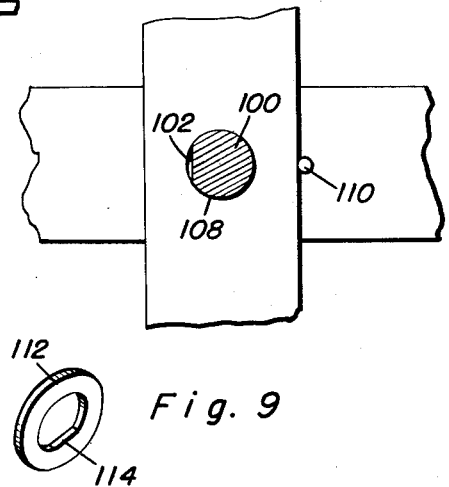
Fig. 7
Fig. 9
Norman K. Warner
INVENTOR.
BY Clarence A.O'Brien
and Harvey B. Jacobson
Attorneys

United States Patent Office 2,722,795
Patented Nov. 8, 1955

2,722,795

RAKING ATTACHMENT FOR LAWN MOWER

Norman K. Warner, Chatham, N. J.

Application January 19, 1953, Serial No. 331,853

7 Claims. (Cl. 56—249)

This invention relates to lawn tools and more particularly to a rotary rake attachment for lawn mowers.

An object of this invention resides in the provision of a rotary rake that may be readily attached to a conventional lawn mower whereby to increase the effectiveness thereof.

Another object is to provide a rotary rake attachment which will allow a mower to cut low-lying and/or creeping vegetation not normally engageable by the mower.

Another object is to provide a lawn mower attachment which will effectively eliminate annual grasses or vegetation from a lawn.

Still another object is to provide a rotary rake attachment for lawn mowers in which the teeth are independently movable on a common shaft.

Another object is to provide a wheeled attachment which is hingedly secured to a mower for independent motion.

A further object is to provide a wheeled rotary rake attachment hingedly secured to a mower whereby the rake is maintained at a substantially constant height above the ground.

A still further object resides in a vegetation engaging attachment doubly hinged to a mower whereby obstructions encountered by the attachment will not impose undue stress upon the attachment structure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a plan view, similar to Figure 3, but showing a modified form of rake assembly;

Figure 6 is an enlarged sectional view taken along line 6—6 of Figure 5 and showing the clutching relation between the rake shaft and teeth;

Figure 7 is a detail section taken along line 7—7 of Figure 6 and showing a pair of rake teeth journalled on the rake shaft.

Figure 8 is an exploded view showing the relationship between each pair of rake teeth; and, Figure 9 is a perspective view of one of the friction washers used for spacing and clutching the rake teeth to the shaft.

Figure 1:
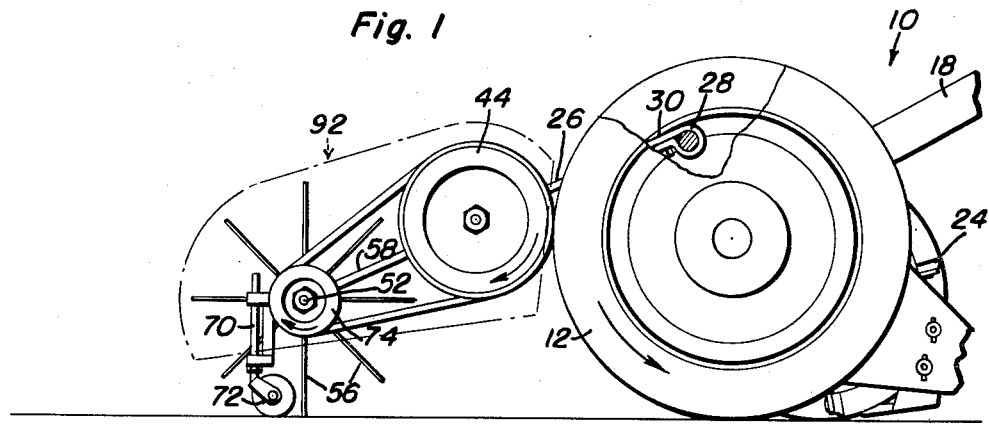
Figure 1 is a side elevation of a lawn mower and attachment showing a housing for the attachment in phantom lines for clarity.
Figure 2:
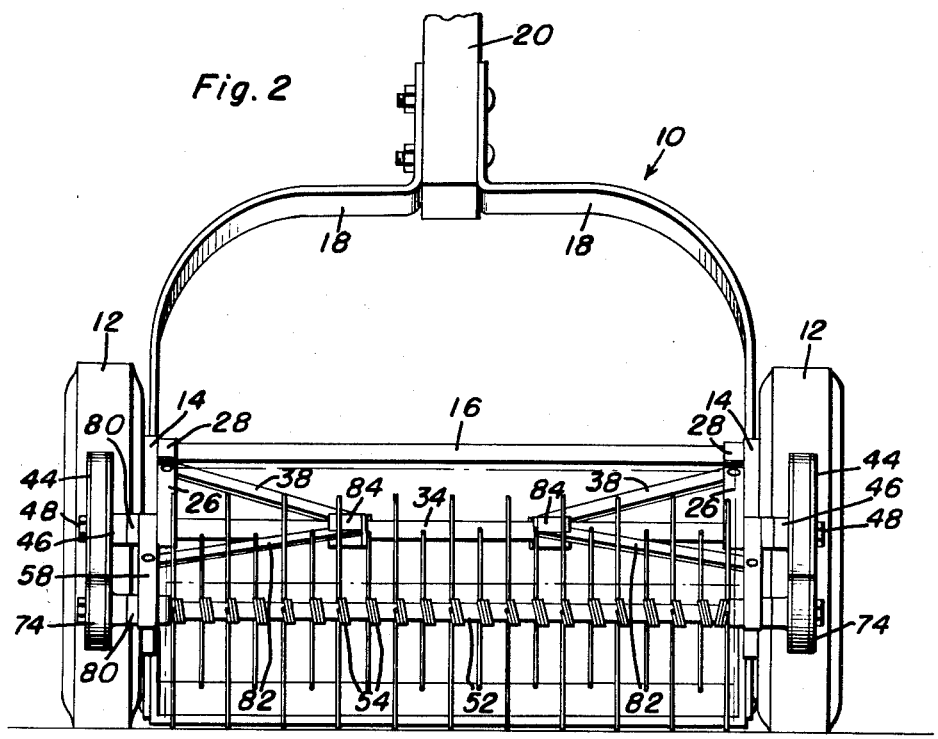
Figure 2 is a front elevation of the mower and attachment with the housing removed.
Figure 3:
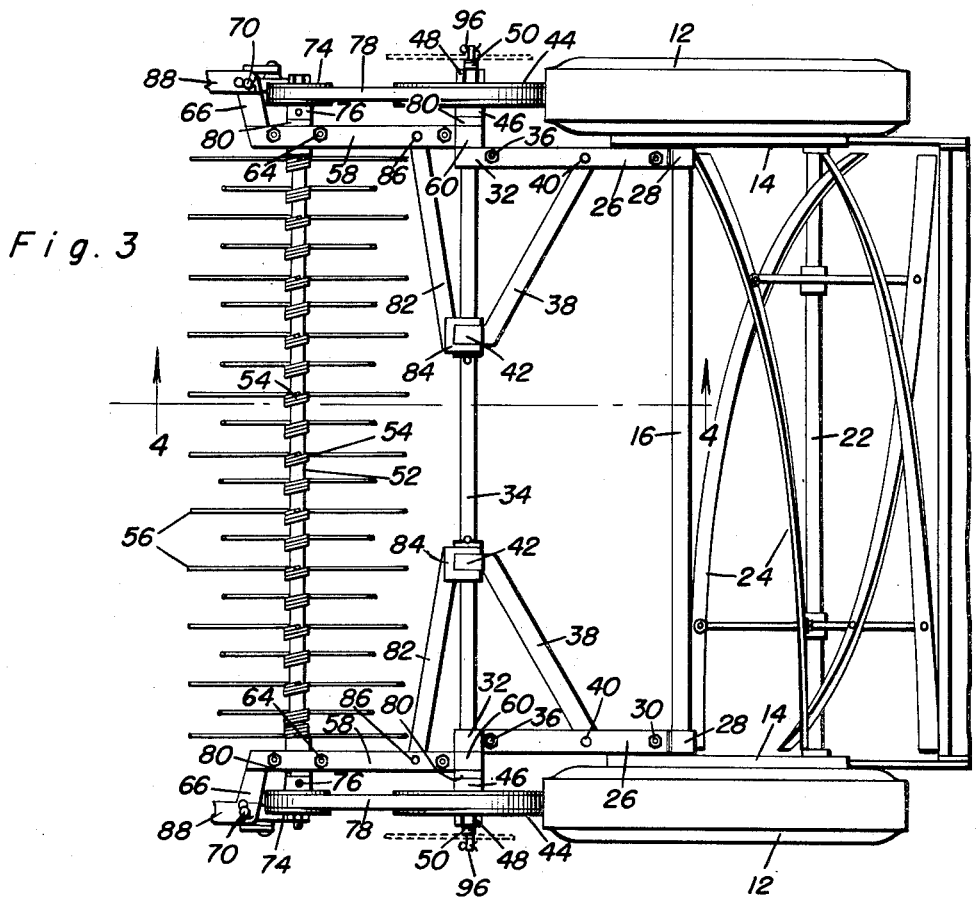
Figure 3 is a plan view of the same with the housing removed.
Figure 4:
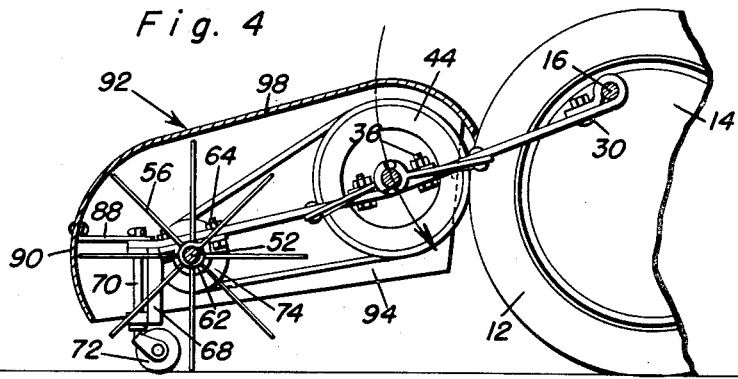
Figure 4 is a vertical section taken substantially along line 4—4 of Figure 3.

Referring now more particularly to the drawings, reference numeral 10 indicates generally a lawn mower including a pair of usual ground wheels 12, non-rotatable casings 14, associated with each wheel and a tie bar 16 connected at opposite ends to the casings. Pivotally secured to the casings are a pair of arcuate brackets 18 carrying handle 20. Also carried by the casings and drivingly connected to wheels 12 by suitable means (not shown), is a rotary cutter shaft 22 carrying the usual radially disposed cutter blades 24.

Although only a rotary reel type of mower has been shown for the purpose of describing the device, such description of only one type is to be considered as exemplary and not restrictive.

To properly describe the invention, it will be necessary to relate that certain annual grasses and other unsightly vegetation grow in a creeping or low lying relation to the ground and are so close thereto as to be completely untouched by ordinary lawn mowers. The purpose of this invention is to provide means wherein such vegetation may be combed or raked upwardly from its low lying position so that a lawn mower may properly cut it. Thus, the vegetation is prevented from seeding out and regenerating and in this manner unsightly grasses and the like can be substantially eliminated from lawns.

For this purpose, a first pair of forwardly extending arms 26 are looped, as at 28, at one end to hingedly receive the tie bar 16 and bolts 30 are provided to maintain the end portions looped. The other end of each arm is similarly looped at 32 to rotatably journal an idler shaft 34. Bolts 36 function similarly to bolts 30. Secured to an intermediate portion of the arms are diagonal stays 38 which have one end fixed thereto by bolts 40, the opposite ends terminating in shaft journals 42.

The idler shaft carries a pair of circumferentially grooved idler wheels 44 engageable with ground wheels 12 to be driven thereby. In this respect, it will be observed that the weight of the assembly thus far described will normally urge the grooved wheels pivotally about tie bar 16 to engage the ground wheels, inasmuch as the tie bar is disposed above the axis of the ground wheels.

Grooved wheels 44 include hub portions 46 and may be feathered or otherwise secured by suitable means (not shown) to shaft 34 and nuts 48 are threaded on shaft end portions 50 to maintain the grooved wheels on the shaft.

Disposed forwardly of shaft 34 and lower than a line passing through the idler shaft and the tie bar, is a rake shaft 52. Tightly coiled at 54, to frictionally engage the rake shaft are a plurality of longitudinally spaced radially extending tines 56. No further securement other than coils 54 is provided between the tines and the rake shaft, thus, establishing an overload release between these parts should the tines engage an obstruction or the like tending to break or snap the same.

To properly position the rake assembly, a second pair of arms 58, journalled to idler shaft 34 at 60, carry the rake shaft through the medium of bearing caps 62 attached to the arms by fasteners 64. Offsets 66 on the forward ends of these arms carry brackets 68 through which the king pins 70 of caster wheels 72 are pivoted. The caster wheels support the forward end of the attachment frame and serve to vertically position the rake assembly so that the tines pass over in closely spaced relation to the ground.

For the purpose of driving the rake assembly, pulleys 74 are pinned at 76, to the rake shaft and a V-belt 78 is trained over the pulley and grooved wheel 44 to provide a driving connection therebetween. To increase its frictional engagement, the belt may be rubber coated in its entirety. The spacing washers 80 tend to decrease friction between the pulley and grooved wheel and arms 58. Also, stays 82 are provided between the second arms and the idler shaft in similar manner to stays 38. Stays 82 are provided with idler shaft journal portions 84 at one end and are secured to the second pair of arms at 86.

The double hinging relationship serves to permit the attachment to move freely and independently of the mower so that the casters will follow the uneven ground surface and most efficiently maintain the rake in proper relation to the ground.

To protect the attachment and also to direct rearwardly material picked up by the rake, a pair of forwardly extending brackets 88 are provided on the arms 58 for attachment to the front wall portion 90 of a housing or cover 92. The housing includes a pair of spaced depending side walls 94 receiving extensions 96 of the idler shaft and a top portion 98. The housing is open at the bottom and rear thereof and provides not only a guard or protector for the rake assembly but also forms a deflector for material picked up by the rake to direct the same rearwardly into the cutter blades.

In Figures 5–9, a modified form of rake is shown wherein the rake shaft 100 is provided with a flat 102 and a threaded portion 104 adjacent one end. Spaced throughout the main intermediate portion of the shaft are a plurality of S-shaped rake teeth 106, each provided at its center with a circular hole 108 for rotatably receiving the shaft. The teeth are disposed in side by side pairs and the teeth of each pair are maintained in right angular relation by means of a projection or stud 110 provided on one tooth which engages a side of the other tooth to maintain the right angular relationship, as most clearly shown in Figure 6 and 7.

Disposed between each pair of teeth are a plurality of friction washers 112. As shown in Figure 9, the washers are centrally apertured to conform to the cross-sectional shape of shaft 100, the key portion 114 engaging the shaft flat 102 to feather the washers to the shaft. Threaded portion 104 carries an adjusting nut 116 which bears against spring 118 effecting frictional interengagement between the various teeth and washers disposed along the shaft. In this manner, a friction drive is imparted to the rake teeth and should any of the teeth engage against an obstruction, these teeth may be stopped in motion until they have passed the obstruction without effecting the drive to other unobstructed teeth. Thus, an overload release or clutch drive similar to the drive to teeth 56, results.

It will be clear that both types of rake teeth shown are to be very slightly spaced above the ground surface by wheels 72 so that vegetation clinging very close to such surface may be uprighted to be cut by the lawn mower blades. It is important that the rake teeth define a counterrotary motion relative to the mower wheels, see arrows of Figure 1, so that the most effective and efficient pick-up action results.

For the purpose of simplicity, the rake teeth are shown as disposed in symmetrical relation, the teeth extending radially from the rake shaft at regular 90 degree circumferential intervals. In actual practice however, the teeth will assume no such fixed angular relation and will constantly vary in their relationship due to slippage of the teeth or pairs of teeth as they encounter various obstructions. This has an important effect on the structure since the teeth, as shown, would impose a full work load on the drive mechanism at every quarter revolution of the rake shaft. In actual practice, this load is distributed more or less evenly throughout the complete revolution of the rake shaft due to the multitude of angular relations existing between the several teeth or pairs of teeth disposed longitudinally along the shaft.

In the form of rake shown in Figure 5, it is readily apparent that the longitudinal spacing may be varied as desired between adjacent pairs of teeth by merely adding or removing the number of friction washers used.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An attachment for lawn mowers comprising a first pair of spaced arms each adapted to be hingedly secured at one end to a lawn mower, a horizontal shaft journalled adjacent the ends thereof in the other ends of said arms, a second pair of spaced arms hingedly secured at one end to said shaft, a rotary rake shaft journalled adjacent the ends thereof in intermediate portions of said second arms, ground engaging wheels secured to the other ends of said second arms, drive means on said first mentioned shaft adapted to engage a ground wheel of a lawn mower, and means drivingly interconnecting said drive means and said rake shaft.

2. In combination with a lawn mower having spaced ground wheels and non-rotatable casings associated with said wheels, a bar extending between said wheels and carried by said casings, a shaft hingedly carried by said bar and disposed forwardly of said mower, driven means on said shaft operatively engaging said ground wheels, a rotary rake hingedly carried by said shaft, and means drivingly interconnecting said driven means and said rake whereby the latter is rotated as the mower is propelled in a forward direction.

3. The combination of claim 2 wherein said driven means comprises a circumferentially grooved wheel.

4. The combination of claim 3 wherein said last means comprises a pulley and a belt, said belt being trained over said pulley and said grooved wheel.

5. In an attachment for lawn mowers as set forth in claim 1 including a plurality of tines rotatably secured in spaced relation on said rotary rake shaft, each of said tines including an overload release means between said tines and said shaft for preventing injury to said tines.

6. In an attachment for lawn mowers as set forth in claim 5 wherein said tines comprise radially extending wire members including a coiled portion concentrically disposed on said rotary rake shaft.

7. In an attachment for lawn mowers as set forth in claim 5, said rotary rake shaft including a longitudinally extending flat portion, a plurality of rake teeth journalled on said shaft, friction washers concentrically disposed on said shaft in interposition between said rake teeth, said washers including key portions retaining said washers in fixed relation to said shaft, said rake teeth including a pair of adjacent tooth members relatively rotatable on said shaft, stop means extending from one of said teeth and engageable with the other for maintaining said teeth at a right angular relationship, and compression spring means on said shaft for urging said washers and rake teeth into frictional interengagement.

References Cited in the file of this patent

UNITED STATES PATENTS

| | | |
|---|---|---|
| 1,538,381 | Bull | May 19, 1925 |
| 2,193,276 | Frush | Mar. 12, 1940 |
| 2,546,620 | Van Ness | Mar. 27, 1951 |
| 2,552,382 | Root | May 8, 1951 |